(12) United States Patent
Lu

(10) Patent No.: US 7,126,767 B2
(45) Date of Patent: *Oct. 24, 2006

(54) WIDE-ANGLE PROJECTION LENS FOR FRONT PROJECTION DISPLAY SYSTEMS

(75) Inventor: Kai Chang Lu, Sutton Coldfield (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/003,243

(22) Filed: Dec. 3, 2004

(65) Prior Publication Data

US 2005/0122599 A1    Jun. 9, 2005

Related U.S. Application Data

(60) Provisional application No. 60/527,424, filed on Dec. 5, 2003.

(51) Int. Cl.
*G02B 13/02* (2006.01)
*G02B 15/14* (2006.01)
*H04N 5/64* (2006.01)

(52) U.S. Cl. .................. 359/750; 359/680; 348/744

(58) Field of Classification Search ................ 359/749, 359/754, 755, 738, 689; 338/744–745, 759, 338/794; 353/69–70
See application file for complete search history.

(56) References Cited

U.S. PATENT DOCUMENTS

| | | | |
|---|---|---|---|
| 4,070,098 A | 1/1978 | Buchroeder | |
| 4,256,373 A * | 3/1981 | Horimoto | ............ 359/755 |
| 4,908,705 A | 3/1990 | Wight | |
| 5,363,242 A | 11/1994 | Yokota et al. | |
| 5,390,048 A | 2/1995 | Miyatake et al. | |
| 5,442,484 A | 8/1995 | Shikawa | |
| 5,510,862 A | 4/1996 | Lieberman et al. | |
| 5,526,186 A | 6/1996 | Sekine | |
| 5,606,459 A | 2/1997 | Nakatsuji | |
| 5,625,495 A | 4/1997 | Moskovich | |
| 5,664,859 A | 9/1997 | Salerno et al. | |
| 5,870,228 A | 2/1999 | Kreitzer et al. | |
| 5,900,987 A | 5/1999 | Kreitzer | |
| 5,969,876 A | 10/1999 | Kreitzer et al. | |

(Continued)

FOREIGN PATENT DOCUMENTS

DE          29 20 360 A1       11/1980

(Continued)

OTHER PUBLICATIONS

Stupp, E.H. & Brennesholtz, M.S.; Projection Displays; John Wiley & Sons Ltd. (1999); pp. 146-150 and 205-208.

*Primary Examiner*—Alicia M Harrington
(74) *Attorney, Agent, or Firm*—Gregg H. Rosenblatt

(57) ABSTRACT

A wide-angle projection lens includes a first lens group of negative refractive power, the first lens group having at least one aspheric surface. The projection lens also includes a second lens group of substantially zero refractive power and a third lens group of positive refractive power. The projection lens satisfies the following three conditions: $|F_1/F|<4.0$ (Condition (1)), $|F_2/F|>50$ (Condition (2)) and $|F_3/F|<3.5$ (Condition (3)). In these conditions, F is the focal length of the wide-angle projection lens; $F_1$ is the focal length of the first lens group; $F_2$ is the focal length of the second lens group; and $F_3$ is the focal length of the third lens group. The wide-angle projection lens is used in a front projection display device.

18 Claims, 1 Drawing Sheet

U.S. PATENT DOCUMENTS

| | | |
|---|---|---|
| 5,978,150 A | 11/1999 | Hamanishi et al. |
| 6,109,767 A | 8/2000 | Rodriguez |
| 6,137,638 A | 10/2000 | Yamagishi et al. |
| 6,179,426 B1 | 1/2001 | Rodriguez, Jr. et al. |
| 6,224,216 B1 | 5/2001 | Parker et al. |
| 6,439,726 B1 | 8/2002 | Piehler |
| 6,476,981 B1 | 11/2002 | Shikama |
| 6,542,316 B1 | 4/2003 | Yoneyama |
| 6,896,375 B1* | 5/2005 | Peterson et al. ............... 353/77 |
| 2002/0057505 A1 | 5/2002 | Sato |
| 2002/0060859 A1 | 5/2002 | Yoneyama |
| 2002/0154418 A1* | 10/2002 | Shikama ..................... 359/754 |
| 2003/0231261 A1* | 12/2003 | Bassi et al. ................. 348/745 |
| 2004/0233394 A1* | 11/2004 | Gohman ...................... 353/70 |
| 2005/0083486 A1* | 4/2005 | Johnson ....................... 353/15 |

FOREIGN PATENT DOCUMENTS

| | | |
|---|---|---|
| JP | 62-201737 U | 12/1987 |
| JP | 02-027390 U | 2/1990 |
| JP | 02-196230 A | 8/1990 |
| JP | 02-230288 A | 9/1990 |
| JP | 03-027085 A | 2/1991 |
| JP | 03-056951 A | 3/1991 |
| JP | 07-151971 | 6/1995 |
| JP | 10-206969 A | 8/1998 |
| JP | 2004-245893 | 9/2004 |
| WO | WO 97/16927 | 5/1997 |
| WO | WO 00/67059 | 11/2000 |

\* cited by examiner

WIDE-ANGLE PROJECTION LENS FOR FRONT PROJECTION DISPLAY SYSTEMS

CROSS REFERENCE TO RELATED APPLICATION

This application claims priority to U.S. Provisional Patent Application No. 60/527424, filed Dec. 5, 2003.

FIELD OF INVENTION

The present invention relates to an optical system for use in a short throw distance, front projection display system where the optical system contains an illumination system, an imaging system, and a wide-angle projection lens. In particular, the present invention relates a wide-angle projection lens that produces an image that is substantially distortion free and requires little to no keystone correction.

BACKGROUND

Electronic or video display systems are devices capable of presenting video or electronic generated images. Whether used in home entertainment, advertising, videoconferences or group conferences, the demand exists for an appropriate display device.

Image quality is one of the factors consumers use to determine the appropriate display device. In general, image quality can be determined qualitatively by factors such as image resolution and image color. As the desire by some consumers is for display devices having larger picture size, image quality can suffer. Typically, a large picture size is one that exceeds about 40 inch screen size as measured along the diagonal of the screen.

While many display devices are available on the market today in front projection systems, there is a continuing need to develop other devices.

SUMMARY

Disclosed herein is a wide-angle projection lens comprising the following components in sequential order from a screen side: (a) a first lens group of negative refractive power, the first lens group having at least one aspheric surface; (b) a second lens group of substantially zero refractive power; and (c) a third lens group of positive refractive power. The phrase "substantially zero refractive power" means less than 3% of the total lens power of all of the lens groups. The projection lens satisfies the following three conditions: Condition (1) is where the absolute value of the ratio of $F_1/F$ is less than 4.0 (i.e., $|F_1/F|<4.0$); Condition (2) is where the absolute value of the ratio of $F_2/F$ is greater than 50 (i.e., $|F_2/F|>50$); and Condition (3) is where the absolute value of the ratio of $F_3/F$ is less than 3.5 (i.e., $|F_3/F|<3.5$). In these conditions, F is the focal length of the wide-angle projection lens. $F_1$ is the focal length of the first lens group. $F_2$ is the focal length of the second lens group. $F_3$ is the focal length of the third lens group. The aperture stop of the projection lens lies within or near the second lens group. In the preceding sentence, the term "near" means that the ratio of the distance of the aperture stop to the second surface of the last lens element in the second lens group to the distance of the projection lens track is about 1/65. The third lens group is arranged so as to image the stop far from the lens, which means that the lens is approximately telecentric in image space. The wide-angle projection lens is used in a front projection system.

Another aspect of the present invention relates to an optical engine comprising (a) an illumination system; (b) an imaging system; and (c) projection lens having an effective focal length of about twice the back focal distance and a speed of less than or equal to about F/3.1. The projection lens generates an image that has substantially no distortion and requires substantially no keystone correction. The optical engine is part of a projection head in a front projection system. The phrase "substantially no distortion" means less than 1% distortion. The phrase "substantially no keystone" means less than 1% keystone. The phrase "front projection system" is one where the projection mechanism and the audience are on the same side of the projection screen and where the images being viewed by the audience is reflected by the screen. The term "distortion," as generally understood in the field of optics, means the final off-axis aberration of the image. The term "keystone," as generally understood in the field of optics, means a particular type of image distortion where, in a front projection system, if the projection optics is placed off-center from the screen, the projection of a rectangular or square image results in a screen image that resembles a keystone, i.e., a quadrilateral having parallel upper and lower edges, but the sides of the screen image is of different lengths.

In one embodiment, the optical system of the present invention is used in a short throw distance, extreme off-axis, front projection system. The term "throw distance" means the distance defined by the normal from the projection screen to the projection lens. The phrase "short throw distance" means a distance of less than one meter. The term "extreme off-axis" means the projected image subtends an angle of greater than 45 degrees. In this document, the term "about" is presumed to modify all numerical values.

These figures are not drawn to scale and are intended only for illustrative purposes.

DETAILED DESCRIPTION

Figure 1:
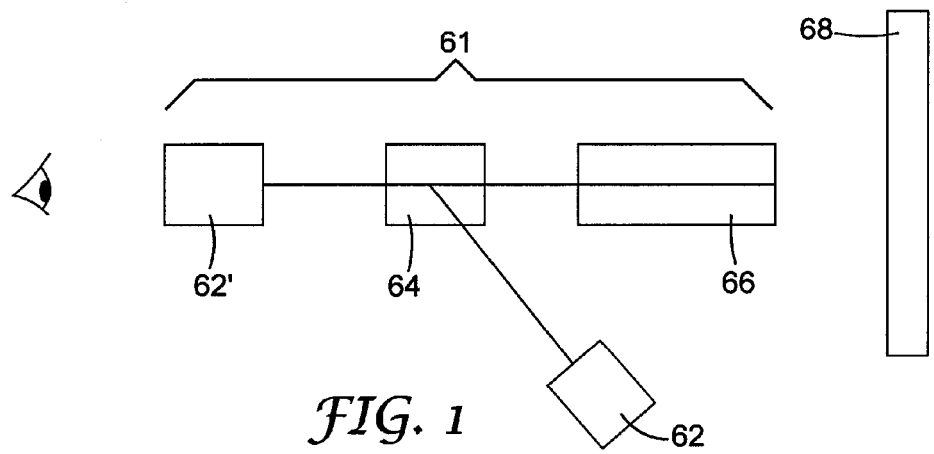
FIG. 1 is a schematic representation of an exemplary optical engine that can be used in the present invention.

FIG. 1 shows a schematic representation of exemplary optical engine 61 having illumination system 62 or 62', imaging system 64 and projection optics 66. While two different illumination systems 62 and 62' are shown, typically only one is used. When the illumination system lies in position depicted by reference number 62, the imager used is a reflective imager. In contrast, when the illumination system lies in position depicted by reference number 62', the imager used is a transmissive imager. The optical engine generates an image on projection screen 68. Because the viewer and the optical engine are on the same side of the projection screen, FIG. 1 depicts a front projection display system using optical engine 61. Each element in the optical engine is discussed in detail below.

The illumination system includes a lamp unit, a filter (such as an infrared light and/or a ultraviolet light rejection filter), a color separation means, and an integrator. In one exemplary embodiment, the lamp unit includes a reflector and a lamp. Suitable, commercially available lamps include (i) Philips UHP type lamp unit, which uses an elliptic reflector, from Philips Semiconductors, Eindhoven, The Netherlands and (ii) OSRAM P-VIP 250 lamp unit from OSRAM GmBH, Munich, Germany. Other suitable lamps and lamp unit arrangements can be used in the present invention. For example, metal halide lamps or tungsten halogen lamps or light emitting diodes (LED's) can be used. The type of filter, color wheel, and integrator that can be used in the present invention are not critical. In one exemplary embodiment, the color separation means is a spinning red/green/blue (RGB) color sequential disc in the light source of the imager. An illustrative commercially available color wheel is the UNAXIS RGBW color wheel, from UNAXIS Balzers, LTD, Balzers, Liechtenstein. A liquid crystal RGB color sequential shutter can also be used in the present invention. An illustrative commercially available integrator is a hollow tunnel type integrator from UNAXIS Balzers LTD.

The imaging system includes an imager and typically also includes electronics. A useful reflective imager that can be used in the present invention is a XGA digital micromirror device (DMD) having a diagonal of about 22 mm, available from Texas Instruments, Dallas, Tex. Alternatively, a transmissive or reflective liquid crystal display can be used as the imager. In the optical engine, the surface of the imager is positioned substantially parallel to the surface of the projection screen.

The wide-angle projection lens of the present invention includes three lens groups in the following sequential order from a screen side: first lens group (G1), second lens group (G2), and third lens group (G3). The term "screen side" means that side of the projection lens closest to a projection screen. The three lens groups are discussed in detail below.

The first lens group is of negative refractive power. The first lens group is formed of a plurality of lens elements. In the first lens group, a first lens element (L1), lying closest to the screen, has the largest diameter of all the lenses in the three lens groups. In one exemplary embodiment, the first lens element in the first lens group has a sufficiently large diameter to project an image at a large field, i.e., at a half field angle greater than 45°, preferably greater than 50° and most preferably about 55° in the direction of the screen with substantially no distortion. In another exemplary embodiment, the first lens element in the first lens group has a diameter greater than 60 mm and less than 75 mm. In yet another exemplary embodiment, the first lens element of the first lens group has a diameter of 70 mm.

The first lens group further includes a second lens element (L2) having at least one aspheric surface. In one embodiment, the second lens element is fabricated from an optical polymer having a refractive index of 1.49 and an Abbe number of 57.2, such as polymethyl methacrylate (PMMA). The shape of the aspheric surface can be defined by the equation below:

$$Z = \frac{cr^2}{1+\sqrt{1-(1+k)c^2r^2}} + \alpha_2 r^2 + \alpha_4 r^4 + \alpha_6 r^4 + \alpha_8 r^8 + \alpha_{10} r^{10} \qquad \text{Equation I}$$

where Z is the surface sag at a distance r from the optical axis of the system c is the curvature of the lens at the optical axis in $$\frac{1}{mm}$$

r is the radial coordinate in mm
k is the conic constant
$\alpha_2$ is the coefficient for second order term, $\alpha_4$ is the coefficient for fourth order term, $\alpha_6$ is the coefficient for sixth order term, $\alpha_8$ is the coefficient for eighth order term, and $\alpha_{10}$ is the coefficient for tenth order term.

In another embodiment, the second surface of the first element of the first lens group has a radius of curvature substantially equal to the radius of curvature of the first surface of the second lens element in the first lens group.

In one embodiment, the first lens group includes two meniscus shaped, nested lens elements, a first meniscus shaped element made of glass and a second meniscus shaped element made of plastic, with controlled thickness on the plastic element. A plastic such as PMMA can be used. The two elements are spaced apart such that the ratio of the distance between the second surface of the first element and the first surface of the second element to the overall effective focal length of the projection lens is 1/175.

Now turning to the second lens group, it is of substantially zero refractive power. The second lens group is formed of a plurality of lens element. The aperture stop of the projection lens lies within or near the second lens group. All lens elements in the second lens group have spherical surfaces. In one exemplary embodiment, the second lens group is formed of a cemented triplet to help control spherical aberration and coma. The on-axis spacing between the lens elements in G1 and the lens elements in G2 can be varied, if desired.

The third lens group is of positive refractive power and all lens elements in this lens group have spherical surfaces. A prism is disposed between the third lens group and the imager, i.e., at a location furthest away from the screen side.

Figure 2:
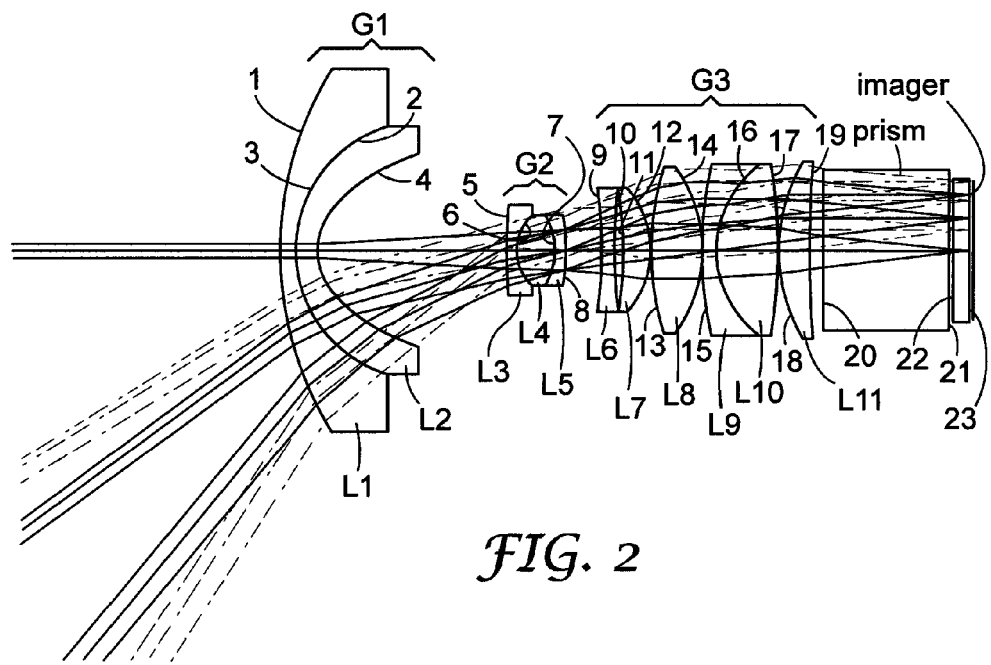
FIG. 2 is a schematic representation of an exemplary projection optics that can be used in the present invention.

FIG. 2 shows one exemplary embodiment of the wide-angle projection lens of the present invention. It has a total of 11 elements in the three lens groups. They are numbered from the screen side. The first lens group (G1) is formed of, in order from the screen side, a first lens element (L1) of negative refractive power and a second lens element (L2) having an aspheric surface on its second surface. G1 is of negative refractive power. The ratio of $F_1/F$ in G1 is such that $-3.5 < F_1/F < -2.3$. The second lens group (G2) is formed of three lens elements, (L3) to (L5) inclusive, cemented together using a conventional adhesive. G2 is substantially zero refractive power. In one embodiment, it can be slightly positive. In another embodiment, it can be slightly negative. The ratio of $F_2/F$ in G2 is such that $-95 < F_2/F < -86$. The aperture stop lies within or near the second lens group. The third lens group (G3) is formed of six lens elements (L6) to (L11) inclusive. G3 is of positive refractive power. The ratio of $F_3/F$ in G3 is such that $2.5 < F_3/F < 3.2$. As shown in FIG. 2, a prism 19 lies to the right of L11, i.e., furthest away from the projection screen.

For the embodiment in FIG. 2, Table 1 below lists the surface number, in order from the screen side (with surface 1 being the surface closest to the screen side of the first lens element L1), the curvature (c) near the optical axis of each surface (in 1/millimeters), the on axis spacing (D) between the surfaces (in millimeters), and the glass type is also indicated. One skilled in the art will recognize that from the glass type, it is possible to determine the index of refraction and Abbe number of the material. Surface 0 is the object surface or the surface of the projection screen. In this embodiment, the wide-angle projection lens has an effective overall focal length of 8.8 mm, a half field angle of 55° in the direction of the screen side and operates at F/2.8. The first lens group G1 has an effective focal length of −25.4 mm; the second lens group G2 has an effective focal length of −800 mm; and the third lens group G3 has an effective focal length of 23.5 mm. The projection lens has a total track of 130 mm.

For the embodiment in FIG. 2, the second surface of the second lens element in the first lens group (denoted as surface 4 in Table 1) is aspheric, as governed by Equation I above, and has the following values for the coefficients: $c=0.0901$, $k=-0.8938$, $\alpha_2=0$, $\alpha_4=1.99\times10^{-5}$, $\alpha_6=-7.468\times10^{-8}$, $\alpha_8=3.523\times10^{-10}$, and $\alpha_{10}=-5.970\times10^{-13}$. The wide-angle of FIG. 2 has a total track distance of 130 mm. As one skilled in the art will appreciate, in certain applications, such as front-projection display applications, it can be advantageous to have a short total track distance because it would result in a compact projection lens thus minimizing the space requirements of the overall optical engine.

TABLE 1

| Surface No. | C (mm$^{-1}$) | D (mm) | Glass Type |
|---|---|---|---|
| 0 | 0 | 755 | |
| 1 | 0.0143 | 3.00 | SK16 |
| 2 | 0.0397 | 0.05 | |
| 3 | 0.0397 | 4.00 | Plastic |
| 4* | 0.0901 | 35.7 | |
| 5 | 0.0134 | 1.87 | N-LAF34 |
| 6 | 0.110 | 7.20 | F2 |
| 7 | −0.0796 | 2.00 | N-LAF34 |
| 8 | −0.0214 | 6.78 | |
| 9 | −0.0124 | 2.33 | N-LAK8 |
| 10 | 0.0117 | 1.49 | |
| 11 | −0.0148 | 5.35 | N-PK52 |
| 12 | −0.0553 | 0.187 | |
| 13 | 0.0178 | 9.48 | N-PK52 |
| 14 | −0.0365 | 0.187 | |
| 15 | 0.0110 | 2.40 | PBH6 |
| 16 | 0.0486 | 11.5 | N-PK52 |
| 17 | −0.00866 | 0.187 | |
| 18 | 0.0313 | 5.99 | N-PK52 |
| 19 | 0.00432 | 2.69 | |
| 20 | 0 | 23.4 | BK7 |
| 21 | 0 | 1.00 | |
| 22 | 0 | 3.00 | FK5 |
| 23 | 0 | 0.480 | |
| 24 | 0 | 0 | |

Tables 2 and 3 below list the general lens data and the surface data summary for the embodiment of FIG. 2.

TABLE 2

GENERAL LENS DATA:

| | |
|---|---|
| Surfaces | 24 |
| Stop | 8 |
| System Aperture | Image Space F/# - 3 |
| Glass Catalogs | schott_2000 OLD_SCHO OHARA CORNING OLD_OHAR MISC |
| Ray Aiming | Real Reference, Cache On |
| X Pupil Shift | 0 |
| Y Pupil Shift | 0 |
| Z Pupil Shift | 0 |
| Apodization | Uniform, Factor = 1.00000E+000 |
| Effective Focal Length | 8.806583 (in air) |
| Effective Focal Length | 8.806583 (in image space) |
| Back Focal Length | 0.4613371 |
| Total Track | 130.237 |
| Image Space F/# | 3 |
| Paraxial Working F# | 3.000816 |
| Working F/# | 2.995898 |
| Image Space NA | 0.1643555 |
| Object Space NA | 0.001891026 |
| Stop Radius | 4.013512 |
| Paraxial Image Height | 13.4 |
| Paraxial Magnification | −0.01134926 |
| Entrance Pupil Diameter | 2.935528 |
| Entrance Pupil Position | 21.1718 |
| Exit Pupil Diameter | 122.5057 |
| Exit Pupil Position | −367.5356 |
| Field Type | Paraxial Image height in millimeters |
| Maximum Field | 13.4 |
| Primary Wave | 0.55 |
| Lens Units | Millimeters |
| Angular Magnification | 0.02396238 |

TABLE 3

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 2361.387 | 0 |
| 1 | STANDARD | 148-2A | 69.7004 | 3 | SK16 | 70 | 0 |
| 2 | STANDARD | | 25.176 | 0.05 | | 47.55672 | 0 |
| 3 | STANDARD | 20A | 25.176 | 4 | 1.491000, 57.200000 | 48 | 0 |
| 4 | EVENASPH | | 11.09472 | 35.68789 | | 38 | −0.8938386 |
| 5 | STANDARD | 449-1B | 74.447 | 1.866667 | N-LAF34 | 17 | 0 |
| 6 | STANDARD | NEW | 9.0968 | 7.2 | F2 | 13.5 | 0 |
| 7 | STANDARD | 46-1 | −12.5675 | 2 | N-LAF34 | 13.5 | 0 |
| STO | STANDARD | 565-1B | −46.676 | 6.775973 | | 13.5 | 0 |
| 9 | STANDARD | 169-3A | −80.8308 | 2.333333 | N-LAK8 | 24 | 0 |
| 10 | STANDARD | NEW | 85.79379 | 1.491645 | | 21.2 | 0 |

TABLE 3-continued

SURFACE DATA SUMMARY:

| Surf | Type | Comment | Radius | Thickness | Glass | Diameter | Conic |
|------|----------|---------|----------|-----------|--------|----------|-------|
| 11   | STANDARD | 650-1A  | −67.755  | 5.352434  | N-PK52 | 21.2     | 0     |
| 12   | STANDARD | 588-1B  | −18.0787 | 0.1866667 |        | 24       | 0     |
| 13   | STANDARD | 116-2A  | 56.217   | 9.481976  | N-PK52 | 32       | 0     |
| 14   | STANDARD | 700-1B  | −27.3991 | 0.1866667 |        | 32       | 0     |
| 15   | STANDARD | 665-1B  | 91.167   | 2.4       | PBH6   | 33       | 0     |
| 16   | STANDARD | 11A     | 20.5695  | 11.47223  | N-PK52 | 33       | 0     |
| 17   | STANDARD | 463-1B  | −115.465 | 0.1866667 |        | 33       | 0     |
| 18   | STANDARD | 35B     | 32       | 5.992456  | N-PK52 | 34       | 0     |
| 19   | STANDARD | 331-1A  | 231.217  | 2.692432  |        | 34       | 0     |
| 20   | STANDARD |         | Infinity | 23.4      | BK7    | 30.90276 | 0     |
| 21   | STANDARD |         | Infinity | 1         |        | 27.53016 | 0     |
| 22   | STANDARD |         | Infinity | 3         | FK5    | 27.31099 | 0     |
| 23   | STANDARD |         | Infinity | 0.48      |        | 26.87009 | 0     |
| IMA  | STANDARD |         | Infinity |           |        | 26.76488 | 0     |

What is claimed is:

1. A wide-angle projection lens comprising the following components in sequential order from a screen side:
   (a) a first lens group of negative refractive power, the first lens group having at least one aspheric surface;
   (b) a second lens group of substantially zero refractive power and wherein an aperture stop lies within or near the second lens group; and
   (c) a third lens group of positive refractive power;
   wherein the following Conditions (1) to (3) are satisfied:

$|F_1/F| < 4.0$      Condition (1)

$|F_2/F| > 50$      Condition (2)

$|F_3/F| < 3.5$      Condition (3)

where
   F is the focal length of the wide-angle projection lens;
   $F_1$ is the focal length of the first lens group;
   $F_2$ is the focal length of the second lens group; and
   $F_3$ is the focal length of the third lens group
   wherein the wide-angle projection lens is used in a front projection display device.

2. The wide-angle projection lens of claim 1, wherein the second lens group comprises a cemented triplet.

3. The wide-angle projection lens of claim 1, wherein the half field angle is at least 45° in the direction of the screen side.

4. The wide-angle projection lens of claim 1, wherein the half field angle is at least 50° in the direction of the screen side.

5. The wide-angle projection lens of claim 1, wherein the half field angle is at least 55° in the direction of the screen side.

6. The wide-angle projection lens of claim 1, wherein the first lens group comprises a first and a second lens element, the second lens element including the aspheric surface at its second surface.

7. The wide-angle projection lens of claim 1, wherein the F/# is less than or equal to about F/2.8.

8. The wide-angle projection lens of claim 1, wherein the first lens group comprises a first and second lens element, the second surface of the first element having a radius of curvature substantially equal to that of the first surface of the second lens element.

9. The wide-angle projection lens of claim 1, wherein Condition (1) is $-3.5 < F_1/F < -2.3$.

10. The wide-angle projection lens of claim 1, wherein Condition (2) is $-95 < F_2/F < -86$.

11. The wide-angle projection lens of claim 1, wherein Condition (3) is $2.5 < F_1/F < 3.2$.

12. An optical engine comprising:
   (a) an illumination system;
   (b) an imaging system; and
   (c) the wide-angle projection lens of claim 1;
   wherein the optical engine is used in a front projection display device.

13. An optical engine comprising:
   (a) an illumination system;
   (b) an imaging system; and
   (c) a projection lens having a back focal length of greater than about twice the effective focal length and a speed of less than or equal to about F/3.1 or less, and
   wherein the projection lens generates an image that has substantially no distortion and requires substantially no keystone correction and wherein the optical engine is part of a projection head in a front projection display device, wherein the projection lens comprises a first lens group, a second lens group, and a third lens group, wherein the first lens group comprises a first and a second lens element, the second lens element including the aspheric surface at its second surface.

14. The optical engine of claim 13, wherein the projection lens has a speed of less than or equal to about F/3.0 and an effective focal length of about 9 mm.

15. The optical engine of claim 13, wherein the projection lens comprises a first lens group, a second lens group, and a third lens group, wherein the first lens group comprises a first meniscus shaped lens element nested with a second meniscus shaped lens element.

16. An optical engine for a front projection display device, comprising:
   an illumination system, an imaging system, and a wide angle projection lens, wherein the wide angle projection lens includes at least a first lens group of negative refractive power and having at least one aspheric surface, wherein the wide angle projection lens outputs an image at a half field angle of at least about 50°, wherein the image has substantially no distortion, wherein the projection lens comprises a first lens group, a second lens group, and a third lens group, wherein the first lens group comprises a first and a second lens element, the second lens element including the aspheric surface at its second surface.

17. The front projection display device of claim 16, wherein the wide angle projection lens outputs an image at a half field angle of at least about 55°.

18. The front projection display device of claim 16, wherein a distance of the first lens group to a viewing screen is less than 1 meter and a projected image size is at least 40 inches (diagonal measurement).

* * * * *

UNITED STATES PATENT AND TRADEMARK OFFICE
CERTIFICATE OF CORRECTION

PATENT NO. : 7,126,767 B2
APPLICATION NO. : 11/003243
DATED : October 24, 2006
INVENTOR(S) : Kai Chang Lu It is certified that error appears in the above-identified patent and that said Letters Patent is hereby corrected as shown below:

Column 3,

Line 62, delete " $Z = \dfrac{cr^2}{1+\sqrt{1-(1+k)c^2 r^2}} + \alpha_2 r^2 + \alpha_4 r^4 + \alpha_6 r^4 + \alpha_8 r^8 + \alpha_{10} r^{10}$ " and insert -- $Z = \dfrac{cr^2}{1+\sqrt{1-(1+k)c^2 r^2}} + \alpha_2 r^2 + \alpha_4 r^4 + \alpha_6 r^6 + \alpha_8 r^8 + \alpha_{10} r^{10}$ -- therefor.

Column 5,
Line 18, after "angle" insert -- projection lens --.

Signed and Sealed this

Twenty-third Day of January, 2007

JON W. DUDAS
*Director of the United States Patent and Trademark Office*